United States Patent
Jong et al.

(10) Patent No.: US 6,504,486 B1
(45) Date of Patent: Jan. 7, 2003

(54) DUAL VOLTAGE SENSE CELL FOR INPUT/OUTPUT DYNAMIC TERMINATION LOGIC

(75) Inventors: Jyh-Ming Jong, Saratoga, CA (US); Derek Tsai, San Jose, CA (US); Leo Yuan, Los Altos, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/707,191

(22) Filed: Nov. 6, 2000

(51) Int. Cl.[7] ............................................. G08B 21/00
(52) U.S. Cl. ...................... 340/660; 340/635; 340/664; 340/539; 340/572.1
(58) Field of Search ................... 340/660, 572, 340/664, 635, 539

(56) References Cited

U.S. PATENT DOCUMENTS

| | | | |
|---|---|---|---|
| 4,355,423 | * 10/1982 | Theall | ........................ 455/608 |
| 5,526,160 | * 6/1996 | Watanabe et al. | ........... 359/163 |
| 5,726,630 | * 3/1998 | Marsh et al. | ................ 340/572 |
| 5,936,565 | * 8/1999 | Bogdan | ....................... 341/152 |
| 6,167,097 | * 12/2000 | Marston et al. | ............. 375/316 |

FOREIGN PATENT DOCUMENTS

WO    WO 98/21859    5/1998

OTHER PUBLICATIONS

PCT International Search Report; International Application No. PCT/US 01/46235; mailed Sep. 5, 2002; 6 pages.

* cited by examiner

*Primary Examiner*—Julie Lieu
(74) *Attorney, Agent, or Firm*—Rosenthal & Osha L.L.P.

(57) ABSTRACT

A process tracking reference voltage generator has been developed for an input/output system. The voltage generator includes a driver component that transmits an output signal to a receiver component. The receiver component generates a reference voltage in relation to the output signal as it varies with changing system operating conditions.

18 Claims, 4 Drawing Sheets

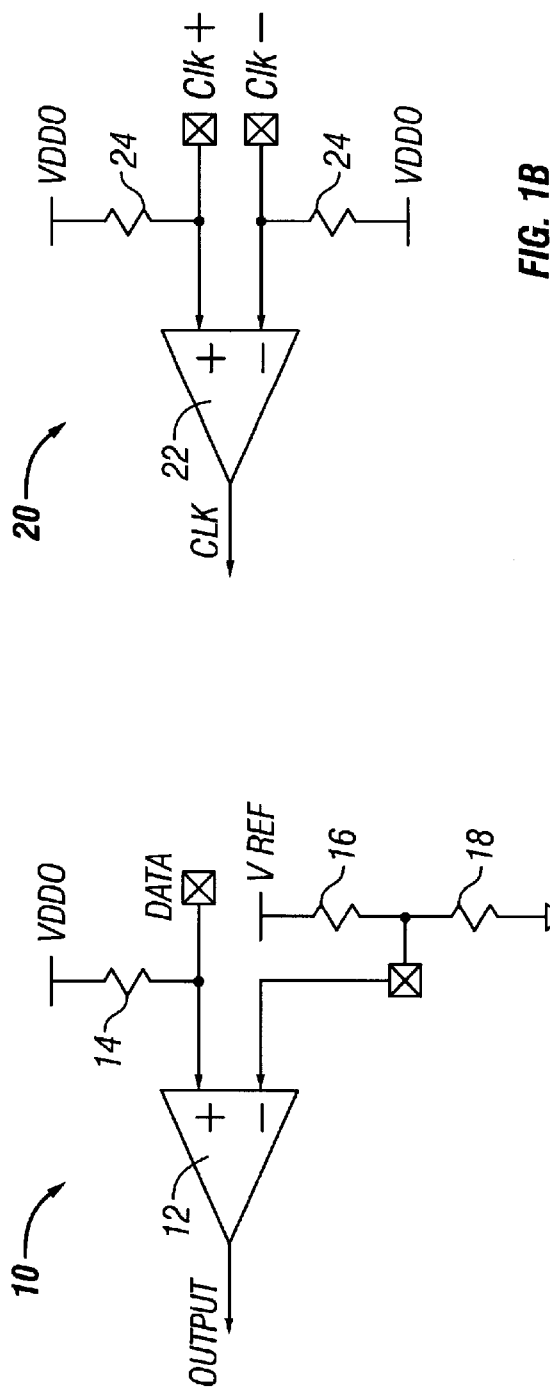
FIG. 1A (Prior Art)
FIG. 1B (Prior Art)
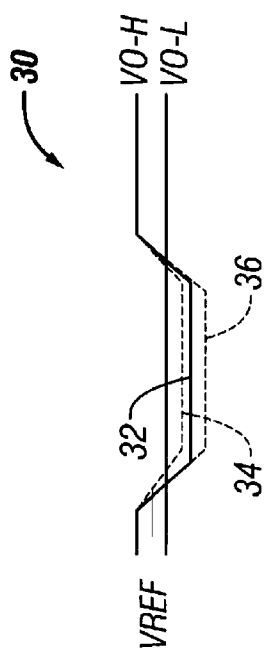
FIG. 2

DUAL VOLTAGE SENSE CELL FOR INPUT/OUTPUT DYNAMIC TERMINATION LOGIC

BACKGROUND

New standards of high speed input/output (I/O) are the results of the development of dynamic termination transistor logic (DTL). FIG. 1A shows a schematic of single ended DTL data receiver 10 used in a DTL I/O interface. The receiver 10 is used as a single ended input buffer. The signal input DATA is connected with a pull-up termination impedance 14 and power supply voltage VDDO. These components are connected to one of the signal input pins of the comparator 12. The other signal input pin of the comparator 12 is connected to an external voltage reference VREF through a voltage divider. The voltage divider circuit includes a resistor 16 tied to VREF and another resistor 18 tied to ground. The input for the pin of the comparator 12 is taken for a point between the two resistors 16, 18. The comparator 12 generates the signal OUTPUT to be used by the system.

Other configurations of DTL receivers may also be used. FIG. 1B shows a differential DTL clock receiver 20 which is used with DTL synchronous I/O signaling. A differential DTL clock receiver includes a comparator 22 similar to the one used with the receiver shown in FIG. 1A. However, this receiver 20 ties the true clock signal (CLK+) and the complementary clock signal (CLK−) to the input pins of the comparator 22. Each of these clock signals are connected with a pull-up termination impedance 24 and power supply voltage VDDO prior to the respective input pins of the comparator 22. The comparator 22 generates a clock signal (CLK) to be used by the system.

FIG. 2 is a graph showing a synchronous I/O signal 30 as it is output from a driver to a receiver input (DATA) as shown FIGS. 1A or 1B. The signal 30 is represented by the output voltage (VO) 32 verses time. VREF is shown as the center point of the voltage swing. The high voltage output level (VO-H) 34 and the low voltage output level (VO-L) 36 are shown as dotted lines. The difference between the ideal output voltage 32 and VO-H 34 and VO-L 36 is indicative of the effects of the pull-down impedance of the circuit. Additionally, the difference in VO and these high and low output limits determine the noise margin of the signal. Specifically, the difference between VO-H and VREF defines the "high noise margin" and the difference between VREF and VO-L defines the "low noise margin".

FIG. 3 shows a schematic of a prior art conventional I/O DTL system. The system includes a receiver module 42 and a transmitter module 44. These modules are attached to each other by a receiver connector 43 and a transmitter connector 45. The transmitter module 44 shows two separate drivers: a first driver 46 with a pull-down impedance 47; and a second driver 48 with a pull-up impedance 49. The pull-up impedance is attached to the local power source for the transmitter module (VDDO2). While only two drivers 46, 48 are shown, multiple drivers 50 are present on the transmitter module. These multiple drivers 50 will connect will a like number of complementary receivers, not shown, in the receiver module 42.

The receiver module 42 shows two receivers 52, 54 similar to the example shown in FIG. 1A. Each receiver 52, 54 receives input into one of its pins from a corresponding driver 46, 48 in the transmitter module 44. Each of these inputs from the drivers 46, 48 are connected to a respective pull-up impedance 53, 55 which is connected to the local power supply (VDDO1) for the receiver module 42. The other input pin of each receiver 52, 54 is tied to VDDO1 which is connected to the receivers 52, 54 through a pair of voltage divider impedances 55, 56, and 57. These impedances 55, 56, and 57 have a ratio of impedance values of 1:3, respectively. While not shown, the system of FIG. 3 would also include a differential DTL clock receiver as shown in FIG. 1B.

Some problems encountered in signal processing of the I/O DTL system, as shown in FIG. 3, include: noise margin balance; power down awareness; and I/O link floating. Referring back to FIG. 2, the VO-H should ideally be equal to the power supply voltage (VDDO) within ±1.5% while the VO-L is determined by the ratio of the pull-up impedance located in a receiver chip and a pull-down impedance in a transmitter chip. If these impedance values are accurately controlled (less than ±5% variation), then a conventional local VREF that is generated from a resistor divided network (shown in FIGS. 1A and 3) may be sufficient to provide a somewhat balanced noise margin of the DTL signal. However, if these impedances are loosely controlled (more than ±15% variation), then VOL will usually vary from chip to chip according to process variation. As a result, the noise margin (as shown in FIG. 2) will significantly increase and affect the signal quality. In this case a VREF voltage tracking to the changes in VOL will provide a scheme to balance the noise margin.

FIG. 4A shows the effects of power failure in the DTL I/O system 60. As shown previously in FIG. 3, VDDO1 represents the power supply of the receiver module 42 and VDDO2 (not shown) represents the power supply of the transmitter module 44. When VDDO2 fails, the differential input to both receivers 52, 54 will be pulled up to VDDO1 which leads to reliability concerns.

When VDDO1 fails there are two possible states of the receiver: the receivers 52, 54 pull-up impedance 53, 55 is high; or the pull-up impedance 53, 55 is low (normal operation). If the impedance is high, the drivers 46, 48 only see an unterminated interconnect. The excess overshoot and undershoot voltage due to reflection could cause overvoltage stress reliability problems. If the impedance is low, the transient current will flow from the drivers 46, 48 into VDDO1 through parasitic paths which leads to reliability problems such as latch-up and electromigration.

FIG. 4B shows the effects of a power failure within the DTL I/O system 60 on a differential DTL clock receiver 64 as shown in FIG. 1B. When VDDO2 fails, both differential inputs pins will be pulled up to VDDO1. This will result in an undefined differential input. Consequently, any random differential mode noise will result in the clock output oscillating at unknown, including higher than normal, frequencies. This would lead to higher power consumption as well as electro-migration reliability concerns.

The problem of I/O "link floating" occurs when one of the modules 42, 44 is unplugged unintentionally while the other module 42, 44 is still in operation. This condition leads to similar effects as with the power failure conditions as described previously with respect to FIGS. 4A and 4B.

SUMMARY OF THE INVENTION

In some aspects the invention relates to an apparatus for generating a reference voltage for an input/output system with a transmitter module and a receiver module, wherein a data transfer occurs between the transmitter module and the receiver module, comprising: a driver component that transmits an output signal; and a receiver component that receives the output signal, wherein the receiver component generates a reference voltage in relation to the output signal.

In an alternative embodiment, the invention relates to an apparatus for generating a reference voltage for an input/output system comprising: a driver module comprising, a driver component that transmits an output signal, a clock driver circuit that transmits a clock signal, and a plurality of data driver circuits that transmit a data transfer; and a receiver module comprising, a receiver component that receives the output signal, wherein the receiver component generates a reference voltage in relation to the output signal, a clock receiver circuit that receives the clock signal, and a plurality of data receiver circuits that receive the data transfer.

In an alternative embodiment, the invention relates to An apparatus for generating a reference voltage for an input/output system with a transmitter module and a receiver module, wherein a data transfer occurs between the transmitter module and the receiver module, comprising: means for transmitting an output signal; and means for generating a reference voltage in relation to the output signal.

In an alternative embodiment, the invention relates to a method for generating a reference voltage for an input/output system comprising: generating an output signal with a driver component; transmitting the output signal from the driver component to a receiver component; and generating a reference voltage with the receiver component, wherein the reference voltage is generated in relation to the output signal.

In an alternative embodiment, the invention relates to a method for disabling a data transfer for an input/output system with a transmitter module and a receiver module, wherein a data transfer occurs between the transmitter module and the receiver module, comprising: generating a driver enable signal with a driver component; and disabling the data transfer with the driver enable signal.

In an alternative embodiment, the invention relates to a method for disabling a data transfer for an input/output system with a transmitter module and a receiver module, wherein a data transfer occurs between the transmitter module and the receiver module, comprising: generating a receiver enable signal with a receiver component; and disabling the data transfer with the receiver enable signal.

The advantages of the invention include, at least: generating a reference voltage for a DTL I/O system that operates over varying system conditions; detecting a power loss for an DTL I/O system and disabling the affected circuits to ensure signal reliability; detecting a unplugged chip for an DTL I/O system and disabling the affected circuits to ensure signal reliability; and activating an alarm when a condition potentially affecting signal reliability occurs.

BRIEF DESCRIPTION OF THE DRAWINGS

FIG. 1A shows a schematic of a prior art single ended DTL data receiver.

FIG. 1B shows a schematic of a prior art differential DTL clock receiver.

FIG. 2 shows a graph of a synchronous I/O signal.

DETAILED DESCRIPTION

Figure 3:
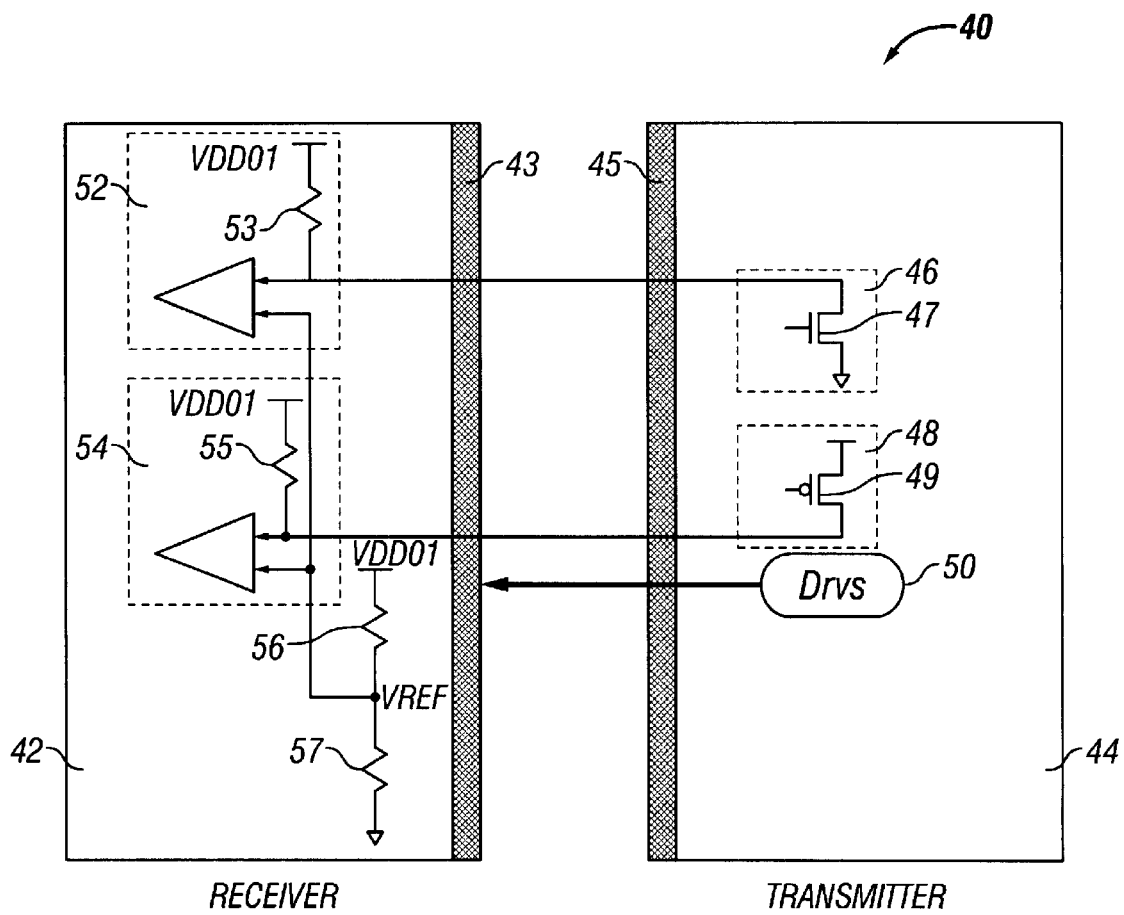
FIG. 3 shows a schematic of a prior art conventional I/O DTL system.
Figure 4A:
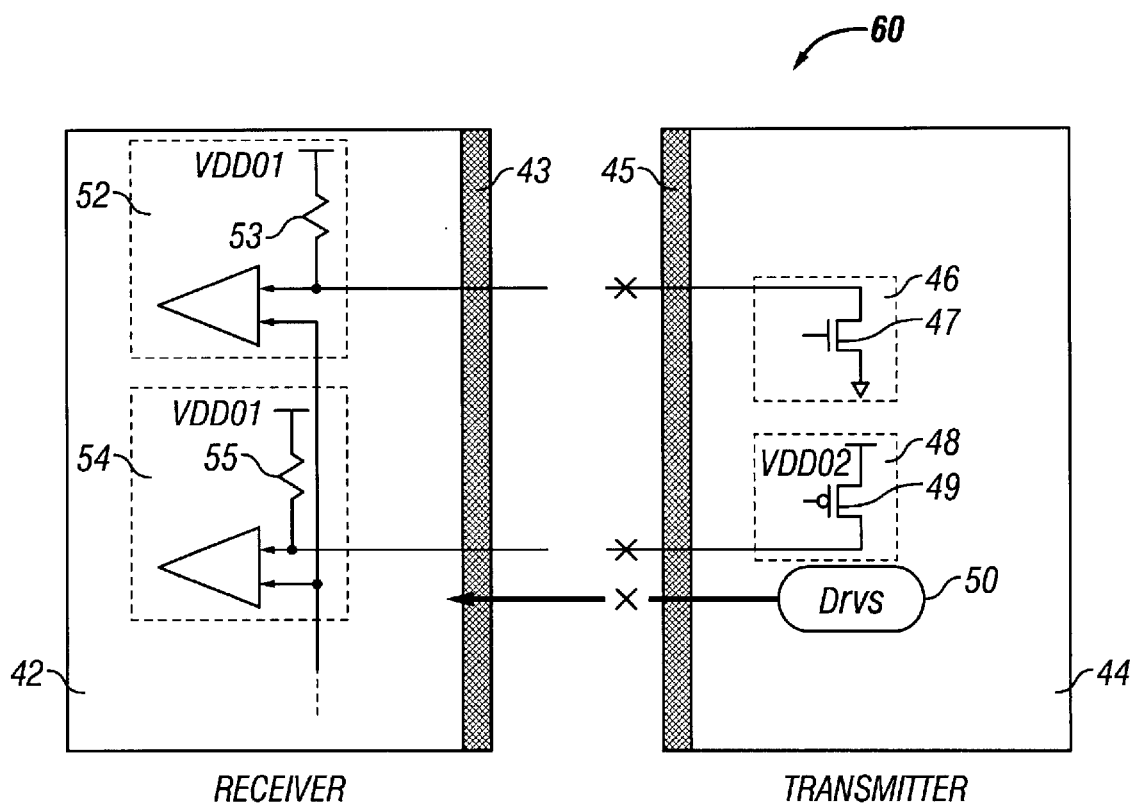
FIG. 4A shows a schematic of a prior art conventional I/O DTL system under power down conditions.
Figure 4B:
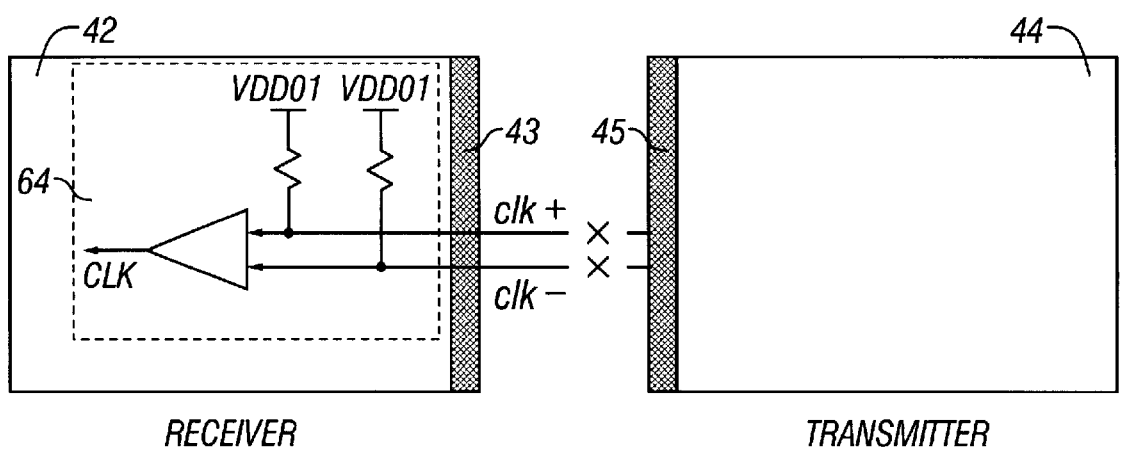
FIG. 4B shows a schematic of a prior art conventional I/O DTL system under link floating conditions.

Exemplary embodiments of the invention will be described with reference to the accompanying drawings. Like items in the drawings are shown with the same reference numbers.

Figure 5:
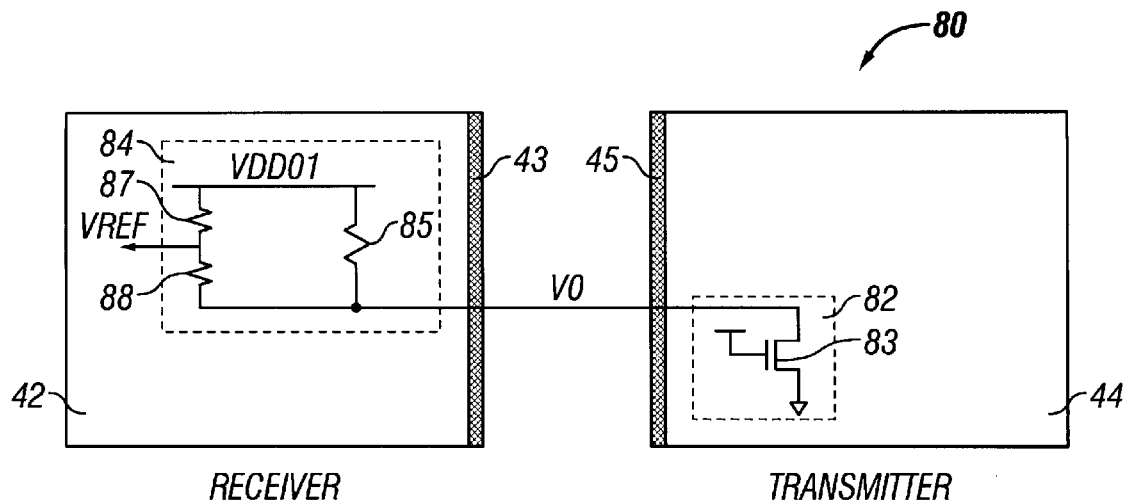
FIG. 5 shows a schematic of one embodiment of a process tracking reference voltage generator for an I/O DTL system.

FIG. 5 shows an embodiment of process-tracking VREF generator 80. It is used to balance noise margins of an I/O DTL system. The generator 80 includes a VREF driver 82 located on the transmitter module 44 and a VREF receiver 84 located on the receiver module 42. The VREF driver 82 includes a pull-down impedance 83. While the impedance 83 is shown as a transistor, in other embodiments, it could be a resistor or any other component that performs a similar function. In this particular embodiment, the impedance 83 value is 50 ohms. The driver 44 transmits the signal output (VO) to the VREF receiver 84 on the receiver module 42. The VREF receiver 84 includes a pull-up impedance 85 and a pair of divider impedances 87, 88. All of these impedances 85, 87, 88 are tied to the local receiver power supply (VDDOI). In this embodiment, the impedance 85 value is 50 ohms and the values of the divider impedances 87, 88 are 1 kilo-ohm each. While the impedance 85 is shown as a transistor, in other embodiments, it could be a resistor or any other component that performs a similar function. The output of the receiver 84 is generated at a point between the two divider impedances 87, 88. The value of the of the output represents the signal mid-point reference: VREF.

As previously discussed with respect to FIG. 2, the noise margin of the signal is the difference in VREF and the high and low output limits 34, 36. Specifically, the difference between VO-H 34 and VREF is defined as the high noise margin and the difference between VREF and VO-L 36 is defined as the low noise margin. A perfectly balanced noise margin is defined as VREF set precisely between VO-H and VO-L. Ideally, VO-H 34 should be equal to the local power supply voltage, VDDO1, by ±1.5%. While VO-L 36 can be calculated from the equation:

$$VO\text{-}L = (VDDO1) * [Rru/(Rru+Rdd)];$$

where Rru is value of the receiver pull-up impedance and Rdd is value of the driver pull-down impedance. As can be seen from the formula, the value of VO-L is determined by the ratio of Rru and Rdd. Once the values for VO-H and VO-L are known, the value of VREF can be calculated from the equation:

$$VREF = (VO\text{-}L) + [(VO\text{-}H) - (VO\text{-}L)/2].$$

The process-tracking VREF generator 80, shown in FIG. 5, is used to derive VREF for the signal across varying operating conditions. Since the I/O DTL synchronous signal is a unidirectional operation, this scheme will always track VO under any process or temperature variation. In the generator 80, VREF is simply derived by an impedance divider from the sensed VO-H (the VDDO1 value) and VO-L (corresponding to the ratio of pull-up/pull-down impedances). This output VREF is then supplied to all DTL receiver units on the receiver module 42.

Figure 6:
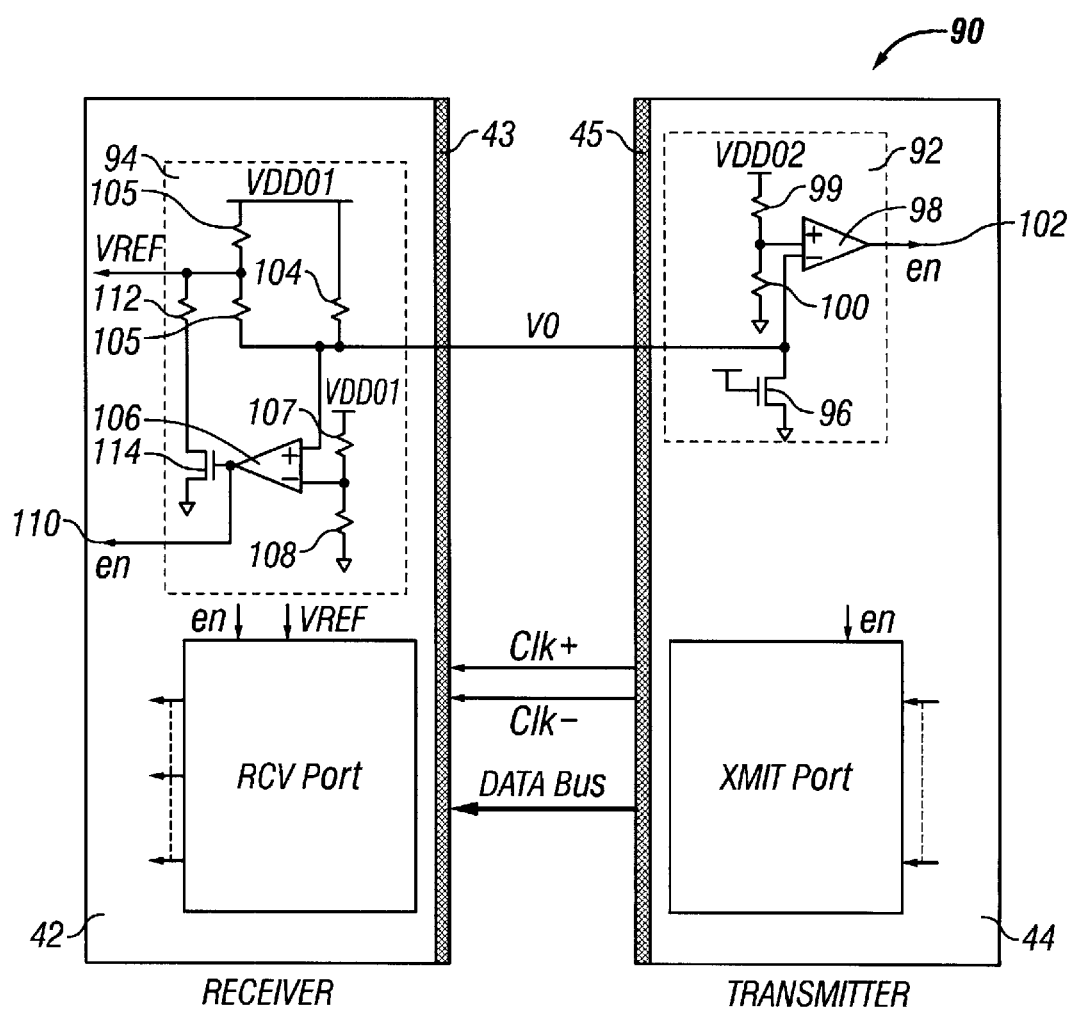
FIG. 6 shows a schematic of an alternative embodiment of a process tracking reference voltage generator for an I/O DTL system.

In order to compensate for power loss situations and I/O link floating detection the VREF generator 80 of FIG. 5 is modified as shown in FIG. 6. FIG. 6 shows a I/O DTL system with a modified process-tracking VREF generator 90. The system 90 includes a transmitter module 44 and a receiver module 42. Each module 42, 44 has a respective port with the ports (XMIT Port and RCV Port) being connected via a DATA bus and CLK signals. Also included in the system 90, is a VREF generator that is modified from the type shown in FIG. 5. The generator includes a VREF driver 92 on the transmitter module 44 and a VREF receiver 94 on the receiver module 42. The driver 92 transmits an output signal (VO) to the receiver 94 which in turn, generates a reference voltage (VREF) for the receiver module 42.

The VREF driver 92 includes a pull down impedance 83 of the same type as shown in FIG. 5. The driver 92 also includes a comparator 98 and a voltage divider with two divider resistors 99, 100. The first resistor 99 is tied to the local power source (VDDO2) while the second resistor 100 is tied to ground. In the embodiment shown, the impedance value of the first resistor 99 is 3 times the impedance value of the second resistor 100. While resistors are shown in this embodiment, in alternative embodiments, other components (i.e., transistors) could be used to accomplish the same function. The output of the pull-down impedance 96 along with the output of the voltage divider are tied to the input pins of the comparator 98. The comparator 98 generates a transmitter enable signal (en) 102 which is sent to XMIT port.

The VREF receiver 94 includes a pull-up impedance 104 and a voltage divider with two identical voltage divider resistors 105 that is tied to the local power source (VDDO1). The reference voltage (VREF) is output between the two divider resistors 105 and is sent to RCV Port. This portion of the arrangement is the same as the VREF receiver 84 shown in FIG. 5. The VREF receiver additionally includes a comparator 106 and a voltage divider with a first resistor 107 that is tied to VDDO1 and a second resistor 108 that is tied to ground. The output of the voltage divider is tied to one input pin of the comparator 106 while the other input pin is tied to the input signal of the VREF driver 92 between the pull-up impedance 104 and the bottom divider resistor 105. In the embodiment shown, the impedance value of the bottom resistor 108 is 3 times the impedance value of the top resistor 107. The comparator 106 generates a receiver enable signal (en) 110 that is transmitted to the RCV port and a NMOS switch 114. The receiver enable signal (en) 110 is sent to the RCV port. The NMOS switch 114 along with a switch resistor 112 are tied to VREF. In this embodiment, the impedance value of the NMOS switch 112 is approximately 50 ohms. Also in this embodiment, the resistance value of the switch resistor 112 should be much greater than the impedance value of the switch.

The function of the comparator 98 of the VREF driver 92 on the transmitter module 44 is to monitor VO versus one quarter of the value of VDDO2. Under normal operations, the driver enable signal (en) 102 has a value of "0". For example, assuming: VDDO2 is 1.5v; the variation of VO is within the range of 0.55v–0.95v (i.e., 0.75±0.2v); and local VREF is 0.375v as set by on-chip resistors; then the enable signal 102 is "0" because VO >0.375v. In contrast, during a power outage where VDDO1 is not available, VO will be strongly pulled down to ground voltage by the pull-down impedance 96. This leads VO to a value of 0.0v (i.e., VO <0.375v) resulting in an enable signal 102 of "1". In the event of the receiver module 42 being unplugged, all of the signal lines become unterminated lines driven by the drivers of the transmitter module 44. As in the case of the power loss, VO will be pulled to ground. This leads VO to a value of 0.0v (i.e., VO <0.375v), also resulting in an enable signal 102 of "1".

When the enable signal 102 of "1" is transmitted to XMIT port, all drivers on the transmitter module 44 are immediately disabled. This prevents an overstress gate-oxide voltage and improves receiver module 42 reliability. Additionally, the enable signal 102 can be used by the system as an alarm requiring inspection for a loss of power or an unplugged chip.

The function of the comparator 106 of the VREF receiver 94 on the receiver module 42 is to monitor VO versus three quarters of the value of VDDO1. Under normal operations, the driver enable signal (en) 110 has a value of "0". For example, assuming: VDDO1 is 1.5v; the variation of VO is within the range of 0.55v–0.95v (i.e., 0.75v±0.2v); and local VREF is 1.125v as set by on-chip resistors; then the enable signal 102 is "0" because VO<1.125v. Additionally, the NMOS switch 114 is turned off by the comparator 106 output of "0". In contrast, during a power loss, all signals to the receiver module 42 are pulled to VDDO1 through the pull-up impedance 104. Meanwhile, this leads to a comparator 106 output of "1" since VO>1.125v. As a result, the NMOS switch 114 is turned on. The NMOS switch causes a regeneration of the VREF by the resistor network to a voltage of approximately two thirds of VDDO1 (i.e., 1.0v). Additionally, the change in the comparator 106 output changes the receiver enable signal 110 as well. This change in the enable signal 110 is transmitted to the RCV port and can be used to disable all of the receivers in the module 42. This prevents receiver output oscillation. Since the regenerated VREF provides a know differential input voltage to all receiver circuits (i.e., signal=VDDO1; VREF=(2/3) *VDDO1), data receiver oscillation can be prevented without disabling all of the receiver circuits. Additionally, the enable signal 110 can be used by the system as an alarm requiring inspection for a loss of power or an unplugged chip.

The advantages of the disclosed invention includes one or more of the following: generating a reference voltage for a I/O DTL system that operates over varying system conditions; detecting a power loss for an I/O DTL system and disabling the affected circuits to ensure signal reliability; detecting a unplugged chip for an I/O DTL system and disabling the affected circuits to ensure signal reliability; and activating an alarm when a condition potentially affecting signal reliability occurs.

It is important to note that while resistors and transistors are shown and described in various embodiments of the invention, in alternative embodiments, other components that are known in the art could be used to accomplish the same function. For example, a resistor that is used as a circuit component could be interchanged for a transistor and vice versa.

While the invention has been disclosed with reference to specific examples of embodiments, numerous variations and modifications are possible. Therefore, it is intended that the invention not be limited by the description in the specification, but rather the claims that follow.

What is claimed is:

1. An apparatus for generating a reference voltage for an input/output system with a transmitter module and a receiver module, wherein a data transfer occurs between the transmitter module and the receiver module, comprising:

a driver component that transmits an output signal; and a receiver component that receives the output signal, wherein the receiver component generates a reference voltage in relation to the output signal, wherein the driver component comprises a pull-down impedance that generates the output signal;

wherein the driver component further comprises:
   a first voltage divider; and
   a comparator that receives input from the first voltage divider and the pull-down impedance;
   wherein the comparator generates a transmitter enable signal, and
   wherein the transmitter enable signal disables the data transfer during a power loss condition.

2. The apparatus of claim 1, wherein the transmitter enable signal activates an alarm during a power loss condition.

3. The apparatus of claim 1, wherein the receiver component comprises:
   a pull-up impedance tied to the output signal and a power supply voltage; and
   a second voltage divider tied to the output signal and the power supply voltage.

4. An apparatus for generating a reference voltage for an input/output system with a transmitter module and a receiver module, wherein a data transfer occurs between the transmitter module and the receiver module, comprising:
   a driver component that transmits an output signal; and
   a receiver component that receives the output signal, wherein the receiver component generates a reference voltage in relation to the output signal, wherein the driver component comprises a pull-down impedance that generates the output signal;
   wherein the driver component further comprises:
      a first voltage divider; and
      a comparator that receives input from the first voltage divider and the pull-down impedance;
      wherein the comparator generates a transmitter enable signal, and
      wherein the transmitter enable signal disables the data transfer during a link floating condition.

5. An apparatus for generating a reference voltage for an input/output system with a transmitter module and a receiver module, wherein a data transfer occurs between the transmitter module and the receiver module, comprising:
   a driver component that transmits an output signal; and
   a receiver component that receives the output signal, wherein the receiver component generates a reference voltage in relation to the output signal, wherein the driver component comprises a pull-down impedance that generates the output signal;
   wherein the driver component further comprises:
      a first voltage divider; and
      a comparator that receives input from the first voltage divider and the pull-down impedance;
   wherein the comparator generates a transmitter enable signal, and
      wherein the transmitter enable signal activates an alarm during a link floating condition.

6. An apparatus for generating a reference voltage for an input/output system with a transmitter module and a receiver module, wherein a data transfer occurs between the transmitter module and the receiver module, comprising:
   a driver component that transmits an output signal; and
   a receiver component that receives the output signal, wherein the receiver component generates a reference voltage in relation to the output signal, wherein the receiver component comprises:
      a pull-up impedance tied to the output signal and a power supply voltage;
      a second voltage divider tied to the output signal and the power supply voltage;
      a third voltage divider tied to the power supply voltage and a ground connection;
      a comparator that receives input from the pull-impedance, the second voltage divider, and the third voltage divider, wherein the comparator generates a receiver enable signal; and
      a switch that receives the receiver enable signal.

7. The apparatus of claim 6, wherein the receiver enable signal disables the data transfer during a power loss condition.

8. The apparatus of claim 6, wherein the receiver enable signal activates an alarm during a power loss condition.

9. The apparatus of claim 6, wherein the receiver enable signal disables the data transfer during a link floating condition.

10. The apparatus of claim 6, wherein the receiver enable signal activates an alarm during a link floating condition.

11. The apparatus of claim 6, wherein the receiver enable signal activates the switch during a variation of an operating condition of the system, wherein the activation of the switch causes a re-generation of the reference voltage.

12. An apparatus for generating a reference voltage for an input/output system with a transmitter module and a receiver module, wherein a data transfer occurs between the transmitter module and the receiver module, comprising:
   means for transmitting an output signal; and
   means for generating a reference voltage in relation to the output signal means detecting a power loss condition; and
   means for disabling the data transfer during the power loss condition.

13. An apparatus for generating a reference voltage for an input/output system with a transmitter module and a receiver module, wherein a data transfer occurs between the transmitter module and the receiver module, comprising:
   means for transmitting an output signal; and
   means for generating a reference voltage in relation to the output signal
   means detecting a link floating condition; and
   means for disabling the data transfer during the link floating condition.

14. A method for disabling a data transfer for an input/output system with a transmitter module and a receiver module, wherein a data transfer occurs between the transmitter module and the receiver module, comprising:
   generating a driver enable signal with a driver component; and
   disabling the data transfer with the driver enable signal;
   wherein the data transfer is disabled at the transmitter module; and
   where in the data transfer is disabled during a power loss condition.

15. A method for disabling a data transfer for an input/output system with a transmitter module and a receiver module, wherein a data transfer occurs between the transmitter module and the receiver module, comprising:
   generating a driver enable signal with a driver component; and
   disabling the data transfer with the driver enable signal;
   wherein the data transfer is disabled at the transmitter module; and
   wherein the data transfer is disabled during a link floating condition.

16. A method for disabling a data transfer for an input/output system with a transmitter module and a receiver module, wherein a data transfer occurs between the transmitter module and the receiver module, comprising:

generating a receiver enable signal with a receiver component; and disabling the data transfer with the receiver enable signal;

wherein the data transfer is disabled at the receiver module; and wherein the data transfer is disabled during a power loss condition.

17. A method for disabling a data transfer for an input/output system with a transmitter module and a receiver module, wherein a data transfer occurs between the transmitter module and the receiver module, comprising:

generating a receiver enable signal with a receiver component; and disabling the data transfer with the receiver enable signal;

wherein the data transfer is disabled at the receiver module; and wherein the data transfer is disabled during a link floating condition.

18. A method for disabling a data transfer for an input/output system with a transmitter module and a receiver module, wherein a data transfer occurs between the transmitter module and the receiver module, comprising:

generating a receiver enable signal with a receiver component; and disabling the data transfer with the receiver enable signal, wherein the data transfer is disabled at the receiver module.

* * * * *

UNITED STATES PATENT AND TRADEMARK OFFICE
CERTIFICATE OF CORRECTION

PATENT NO. : 6,504,486 B1
DATED : January 7, 2003
INVENTOR(S) : Jong et al.

It is certified that error appears in the above-identified patent and that said Letters Patent is hereby corrected as shown below:

<u>Column 8,</u>
Lines 28 and 29, replace "output signal means detecting a power loss condition;" with
-- output signal;
means detecting a power loss condition; --
Line 52, replace "where in" with -- wherein --

Signed and Sealed this

Third Day of June, 2003

JAMES E. ROGAN
*Director of the United States Patent and Trademark Office*